(12) United States Patent
Bradberry et al.

(10) Patent No.: US 7,644,999 B2
(45) Date of Patent: Jan. 12, 2010

(54) IDLER ASSEMBLY, AND METHOD FOR RETROFITTING AN EXISTING IDLER ASSEMBLY

(76) Inventors: Edwin Bradberry, One North Central Ave., Phoenix, AZ (US) 85004; Leeland Boday, One North Central Ave., Phoenix, AZ (US) 85004; Chris Peralta, One North Central Ave., Phoenix, AZ (US) 85004

( * ) Notice: Subject to any disclaimer, the term of this patent is extended or adjusted under 35 U.S.C. 154(b) by 395 days.

(21) Appl. No.: 11/252,894

(22) Filed: Oct. 18, 2005

(65) Prior Publication Data

US 2007/0096559 A1     May 3, 2007

(51) Int. Cl.
    *B62D 55/14*     (2006.01)
    *F16C 35/00*     (2006.01)

(52) U.S. Cl. ........................... 305/136; 305/138
(58) Field of Classification Search .......... 305/130, 305/132, 136, 138, 195, 199, 15, 19, 137, 305/143; 474/152, 160; 301/1, 111.02, 111.04, 301/126

See application file for complete search history.

(56) References Cited

U.S. PATENT DOCUMENTS

| | | | | |
|---|---|---|---|---|
| 1,443,556 A | * | 1/1923 | Beal et al. | 305/132 |
| 1,796,533 A | * | 3/1931 | Pearson | 180/9.64 |
| 1,990,806 A | | 2/1935 | Watson et al. | |
| 2,827,339 A | * | 3/1958 | Zunich | 384/418 |
| 3,580,345 A | * | 5/1971 | Brown et al. | 180/9.1 |
| 3,773,393 A | * | 11/1973 | Story et al. | 305/119 |
| 3,993,356 A | * | 11/1976 | Groff et al. | 301/6.91 |
| 4,141,598 A | | 2/1979 | Cline | |
| 4,406,641 A | * | 9/1983 | Mallet | 464/162 |
| 4,448,273 A | | 5/1984 | Barbieri | |
| 4,527,039 A | | 7/1985 | Fuwesi | |
| 4,582,153 A | | 4/1986 | Shinsen | |
| 4,695,102 A | * | 9/1987 | Crotti | 305/100 |
| 4,739,852 A | | 4/1988 | Stevens et al. | |
| 4,815,794 A | * | 3/1989 | Becker et al. | 305/119 |
| 4,838,373 A | | 6/1989 | Price et al. | |
| 4,923,257 A | * | 5/1990 | Purcell | 305/143 |
| 4,987,965 A | | 1/1991 | Bourret | |
| 6,006,847 A | | 12/1999 | Knight | |
| 6,250,577 B1 | * | 6/2001 | Koenig | 241/239 |
| 6,364,438 B1 | | 4/2002 | Hasselbusch et al. | |
| 6,457,786 B1 | * | 10/2002 | Maguire | 305/136 |
| 6,655,482 B2 | | 12/2003 | Simmons | |
| 6,761,235 B2 | | 7/2004 | Simmons | |

* cited by examiner

*Primary Examiner*—S. Joseph Morano
*Assistant Examiner*—Kip T Kotter
(74) *Attorney, Agent, or Firm*—Fennemore Craig, P.C.

(57) ABSTRACT

An idler assembly is disclosed for a shovel having a flexible track assembly. In an embodiment, the idler assembly comprises an idler gear operatively associated with the track assembly; a sleeve; a shaft, sets of splines on the shaft and on the sleeve sized for engagement, and connectors at ends of the shaft; at least one bearing block forming a bore therethrough; at least one bushing liner disposed within at least one bearing block; and at least one retaining device for constraining the shaft from withdrawal from the bearing block. A method for retrofitting a shovel with an existing idler assembly is disclosed. In an embodiment, the method comprises positioning at least one bushing liner within a bore of at least one bearing block; attaching an idler shaft and an idler gear together; and positioning the idler shaft within the at least one bushing liner.

11 Claims, 14 Drawing Sheets

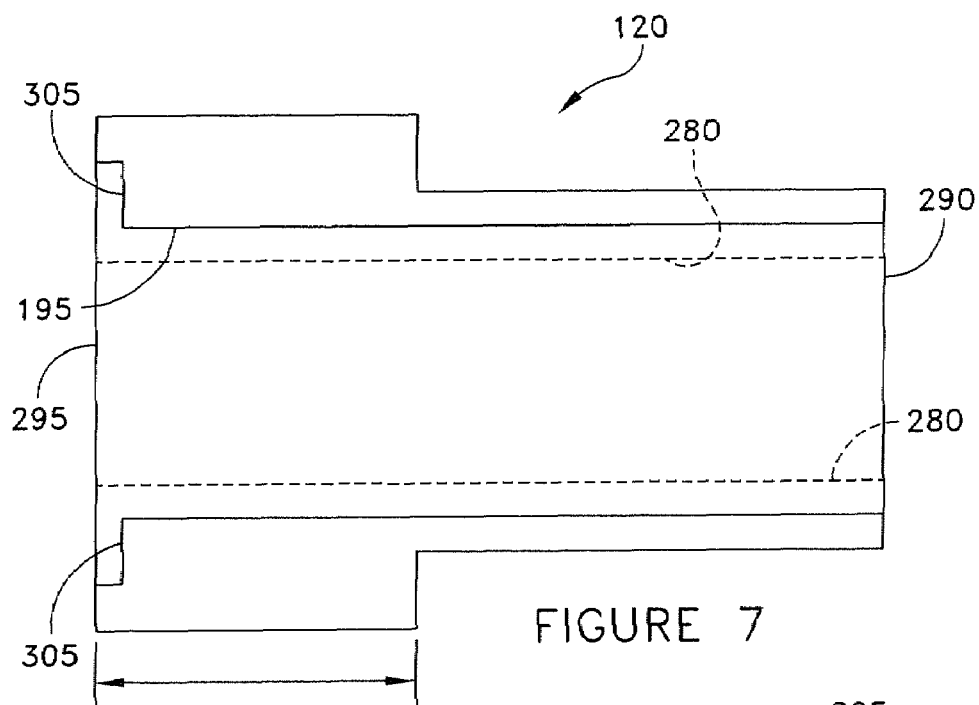
FIGURE 7
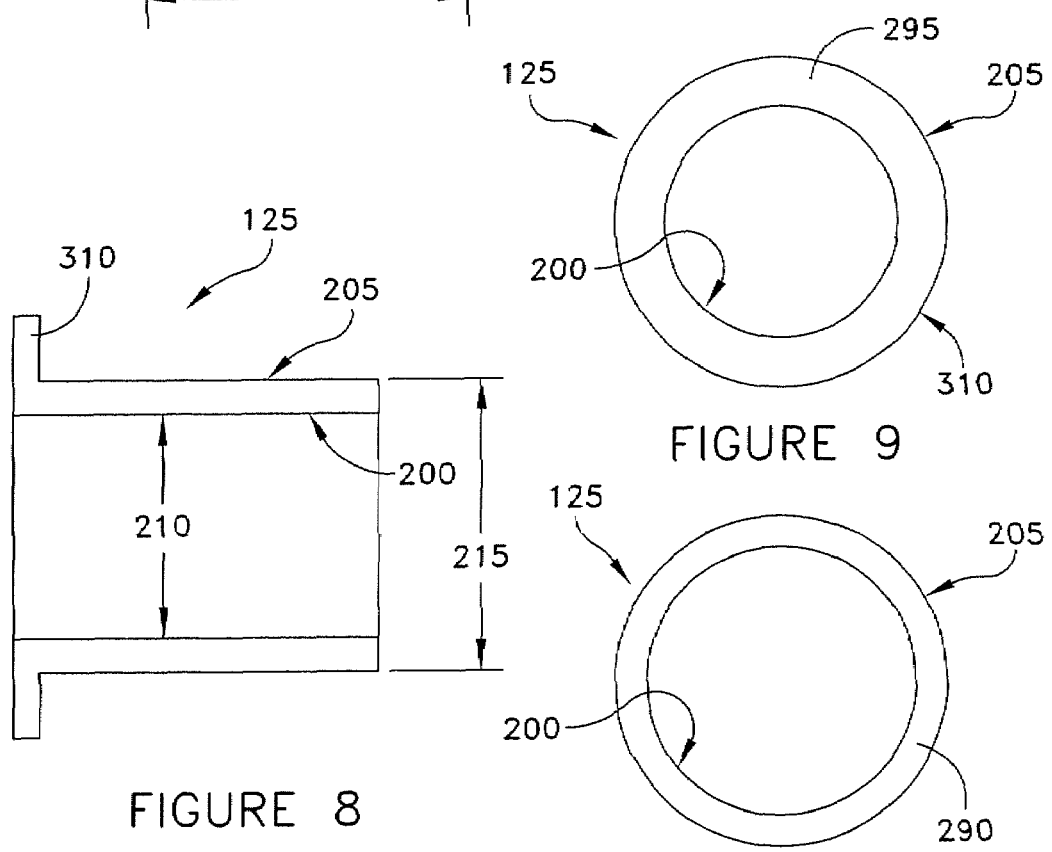
FIGURE 8
FIGURE 9
FIGURE 10

IDLER ASSEMBLY, AND METHOD FOR RETROFITTING AN EXISTING IDLER ASSEMBLY

BACKGROUND

Tracked vehicles, such as bulldozers, moveable cranes, and shovels utilize idler wheels. The idler wheel is typically mounted for rotation on a shaft, which in turn is fixedly mounted to the frame of the tracked vehicle. Unfortunately, such a mounting arrangement generally causes wear on the shaft at a region within the frame. This wear is often difficult to detect as it is hidden from view. The location of the wear region may also be difficult for providing regular maintenance to the shaft. Additionally, repair of the idler wheel is often extensive as the non-rotating shaft must be removed from the frame and replaced. Such a repair is both time consuming and expensive.

SUMMARY OF THE INVENTION

In one embodiment, there is provided an idler assembly for a shovel having a flexible track assembly, the idler assembly comprising an idler gear having an inner portion and an outer portion, the inner portion forming an opening therethrough, and the outer portion operatively associated with the flexible track assembly; a sleeve having an inner surface and an outer surface in opposition to one another, the inner surface of the sleeve forming an inner diameter, a set of splines disposed on the inner surface, and the outer surface of the sleeve forming an outer diameter sized for attachment within the inner portion of the idler gear; a shaft having an outer portion with a set of splines thereon, the outer portion sized for placement within the inner diameter of the sleeve, the set of splines of the shaft and the set of splines of the sleeve sized for engagement with one another, and connectors disposed at opposed ends of the shaft; at least one bearing block in attachment to a frame assembly of the shovel, each of the at least one bearing block forming a bore therethrough; at least one bushing liner disposed within the at least one bearing block, respectively, each of the at least one bushing liner having an inner surface and an outer surface in opposition to one another, the inner surface of each of the at least one bushing liner forming an inner diameter sized for placement of the shaft therein, and the outer surface of each of the bushing liners forming an outer diameter sized for placement within the bore of each of the at least one bearing block; and at least one retaining device for constraining the shaft from withdrawal from the bore of the at least one bearing block, the at least one retaining device in removable attachment to the connectors disposed at opposed ends of the at least one bearing block, respectively, wherein the shaft rotates within the at least one bearing block as the idler gear rotates in response to movement of the flexible track assembly.

In another embodiment, there is provided a method for retrofitting a shovel with a flexible track assembly from an existing idler assembly to an improved idler assembly, the method comprising positioning at least one bushing liner within a bore of at least one bearing block, respectively; attaching an idler shaft and an idler gear together with one another, wherein the shaft rotates together with the idler gear; and positioning a first portion and a second portion of the idler shaft within the at least one bushing liner positioned within the bore of the at least one bearing block, and the first portion and the second portion disposed on opposing sides of the idler gear in attachment thereto.

In yet another embodiment, there is provided method for retrofitting a shovel with a flexible track assembly from an existing idler assembly to an improved idler assembly, the method comprising removing a non-rotating shaft from bearing blocks in attachment to a frame assembly of the shovel, and from an idler gear operatively associated therewith; boring an enlarged opening through the idler gear, wherein the enlarged opening is sized for attachment of a sleeve therein; boring enlarged openings through the bearing blocks, respectively, wherein the enlarged openings are each sized for placement of a bushing liner in the bearing blocks, respectively; attaching the sleeve to an inner portion of the idler gear; placing the sleeve and the idler gear between the bearing blocks; placing a shaft through the enlarged openings of the bearing blocks and through the sleeve in attachment to the inner portion of the idler gear, wherein the shaft and the sleeve each comprise a set of splines that mate with one another; and attaching a retaining device to each one of the ends of the shaft, wherein the retaining device constrains the shaft from withdrawal from the bores of each one of the bearing blocks.

In still another embodiment, there is provided a kit for retrofitting a shovel with a flexible track assembly, the kit comprising a sleeve having an inner surface and an outer surface in opposition to one another, the inner surface of the sleeve forming an inner diameter, a set of splines disposed on the inner surface, and the outer surface of the sleeve forming an outer diameter sized for attachment within the inner portion of the idler gear; a shaft having an outer portion with a set of splines thereon, the outer portion sized for placement within the inner diameter of the sleeve, the set of splines of the shaft and the set of splines of the sleeve sized for engagement with one another, and connectors disposed at opposed ends of the shaft; at least one bushing liner for disposal within a bore formed in at least one bearing block, each of the at least one bushing liner having an inner surface and an outer surface in opposition to one another, the inner surface of the at least one bushing liner forming an inner diameter sized for placement of the shaft therein, and the outer surface of the at least one bushing liner forming an outer diameter sized for placement within the bore of the at least one bearing block; and at least one retaining device for constraining the shaft from withdrawal from the bore of the at least one bearing blocks, the at least one retaining device for removable attachment to the connectors disposed at opposed ends of the at least one bearing block, respectively, wherein the shaft rotates within the at least one bearing block as the idler gear rotates in response to movement of the flexible track assembly.

In another embodiment, there is provided an idler assembly for idler assembly for a shovel having a flexible track assembly, the idler assembly comprising an idler gear operatively associated with the flexible track assembly; a shaft fixedly connected to the idler gear, the shaft having a first portion and a second portion on opposed sides of the idler gear, wherein the shaft rotates together with the idler gear; and at least one bearing block in attachment to a frame assembly of the shovel, each of the at least one bearing blocks forming a bore therethrough, and at least one of the first portion and the second portion of the shaft extending through the at least one bearing block.

Other embodiments are also disclosed.

BRIEF DESCRIPTION OF THE DRAWINGS

Illustrative embodiments of the invention are illustrated in the drawings, in which:

FIG. 7 is a diagrammatic illustration of a bearing block having a bore sized to accommodate a rotatable idler shaft therein together with bushing material;

FIGS. 8-10 are diagrammatic illustrations of a brass bushing configured for placement between the idler block and the idler shaft;

DETAILED DESCRIPTION OF AN EMBODIMENT

Figure 1:
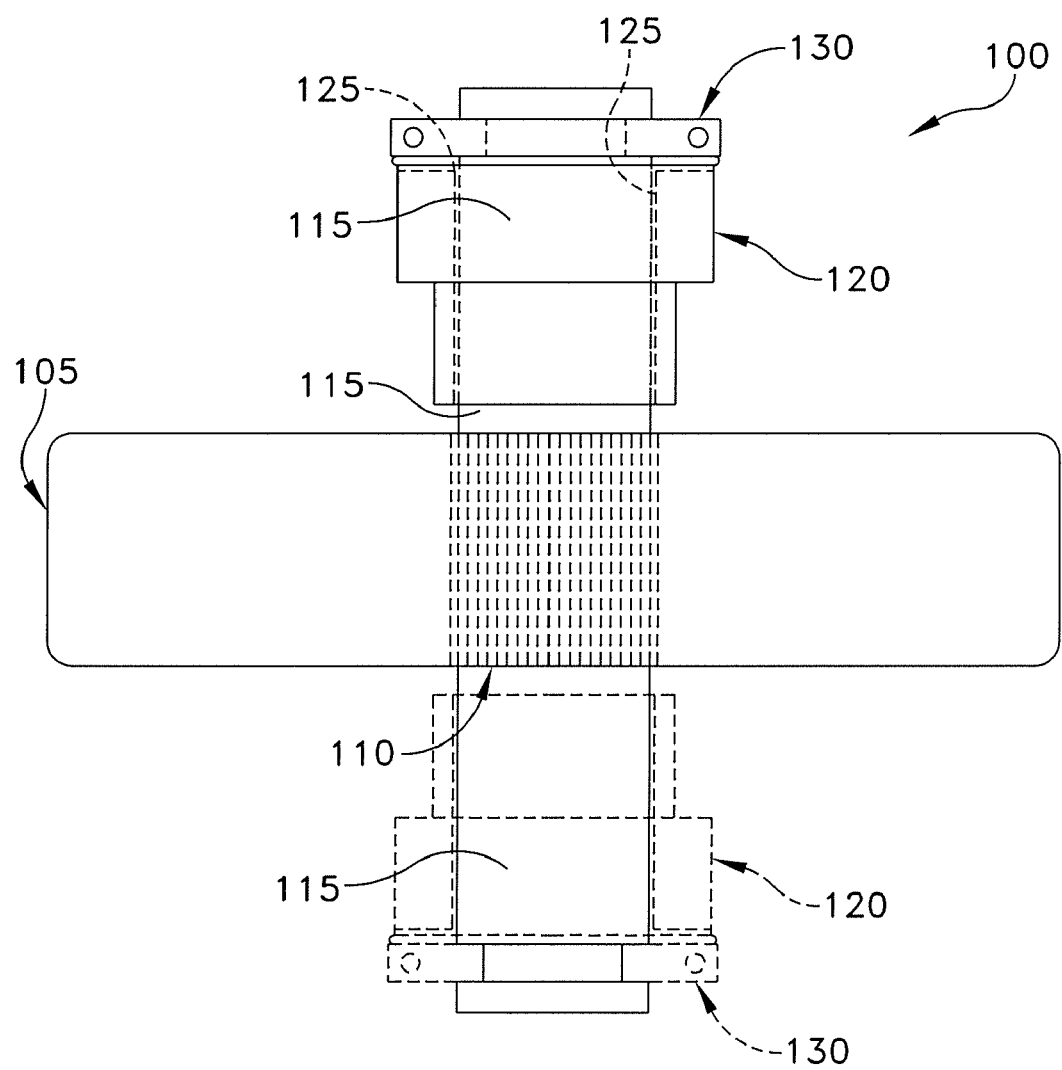
FIG. 1 is a diagrammatic illustration of a rotatable idler shaft assembly of an embodiment, an idler gear and the rotatable idler shaft are fixedly attached to one another, and the ends of the rotatable idler shaft are disposed in brass bushings in bearing blocks.

Referring to FIG. 1, and in an embodiment, there is shown an idler assembly 100 for a shovel having a flexible track assembly. Generally, idler assembly 100 includes an idler gear 105, a sleeve 110, a shaft 115, at least one bearing block 120, at least one bushing liner 125, and at least one retaining device 130.

Idler shaft 115 of idler assembly 100 rotates to provide enhanced component life in contrast with a fixed idle shaft of an idler assembly. This reduces unplanned maintenance and may allow easier inspection for wear of rotatable idler shaft 115 compared to an arrangement having a fixed idle shaft.

Figure 2:
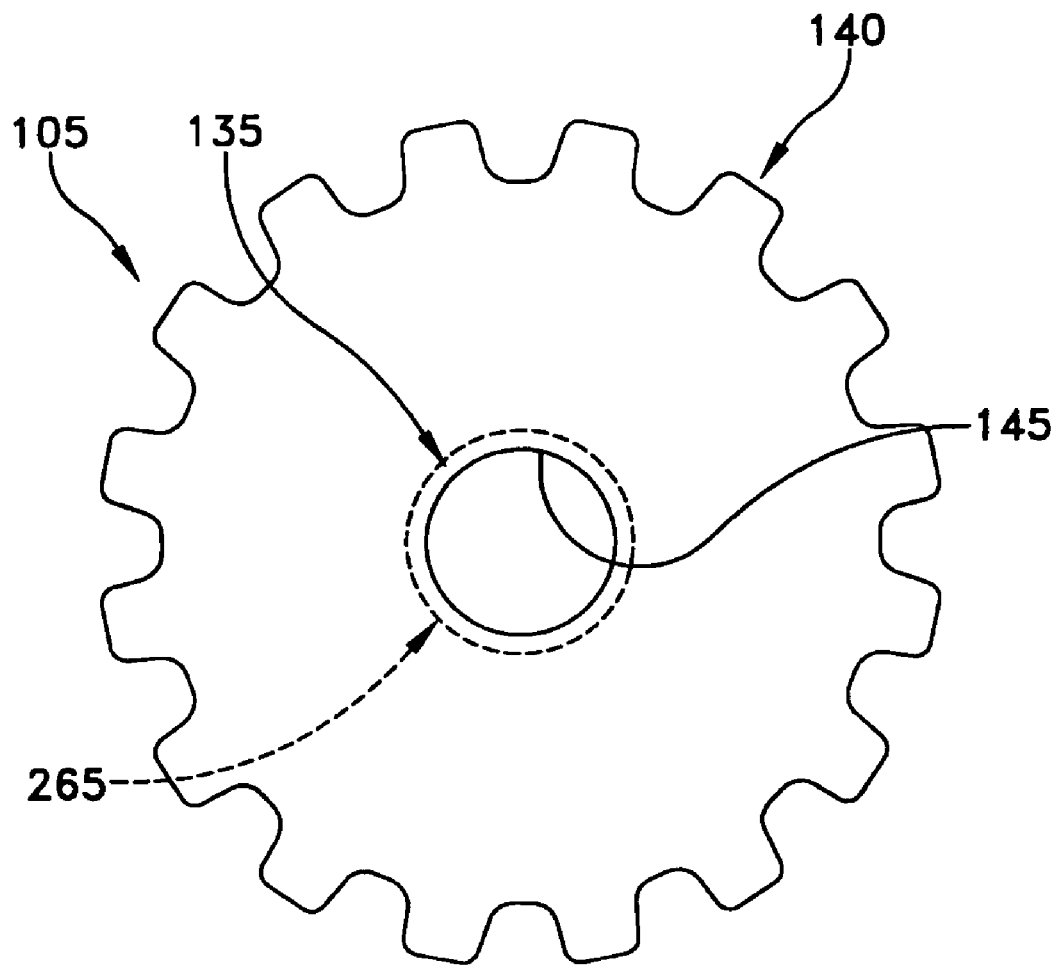
FIG. 2 is a diagrammatic illustration of an idler gear having an opening for attachment to a sleeve and a shaft.
Figure 3:
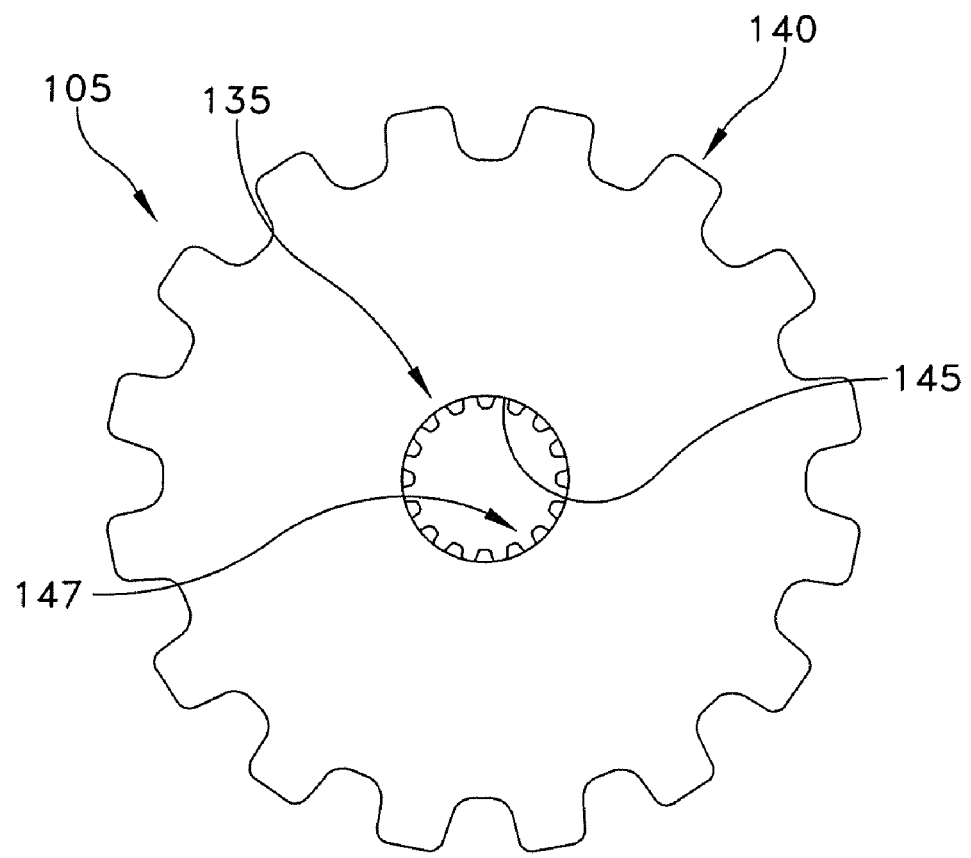
FIG. 3 is a diagrammatic illustration of an idler gear having an opening with a set of splines for attachment to a shaft having a set of splines.

Referring now to FIGS. 1, 2, and 3, there is shown idler gear 105 having an inner portion 135 and an outer portion 140. An opening 145 is formed through inner portion 135. Outer portion 140 is operatively associated with a flexible track assembly.

Figure 5:
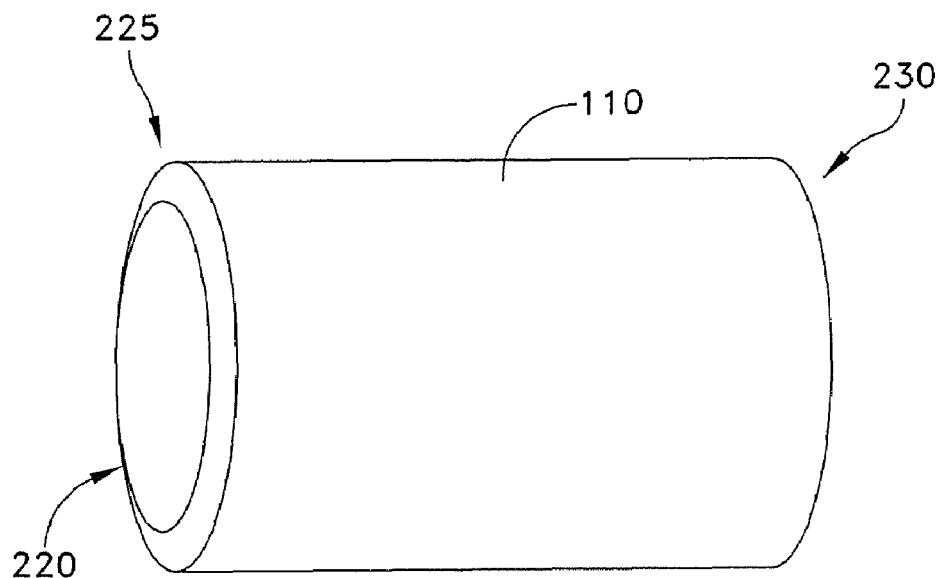
FIGS. 5 and 6 are illustrations of an attachment sleeve having splines formed on the inner wall for attachment to splines formed on a rotatable shaft, and the outer wall of the sleeve and the opening of the idler gear sized for attachment to one another.
Figure 6:
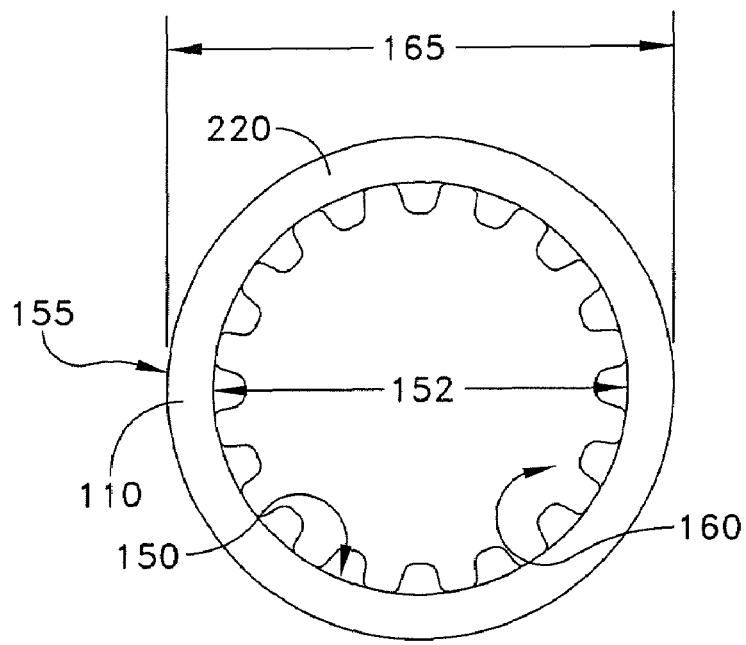

Referring to FIGS. 2, 5 and 6, and in an embodiment, sleeve 110 may be secured within opening 145 of idler gear 105. In one embodiment, sleeve 110 and idler gear 105 have a metal to metal fit. Optionally, sleeve 110 and idler gear 105 are welded together.

Referring to FIG. 3, and in an embodiment, a set of splines 147 may be disposed within opening 145 of idler gear 105. In one embodiment, shaft 115 and idler gear 105 may be joined directly to one another.

Referring to FIGS. 1, 5 and 6, there is shown sleeve 110 having an inner surface 150 and an outer surface 155 in opposition to one another. Inner surface 150 of sleeve 110 may form an inner diameter 152. A set of splines 160 may be disposed on inner surface 150. Outer surface 155 of sleeve 110 may form an outer diameter 165 sized for attachment within inner portion 135 of idler gear 105.

Figure 4:
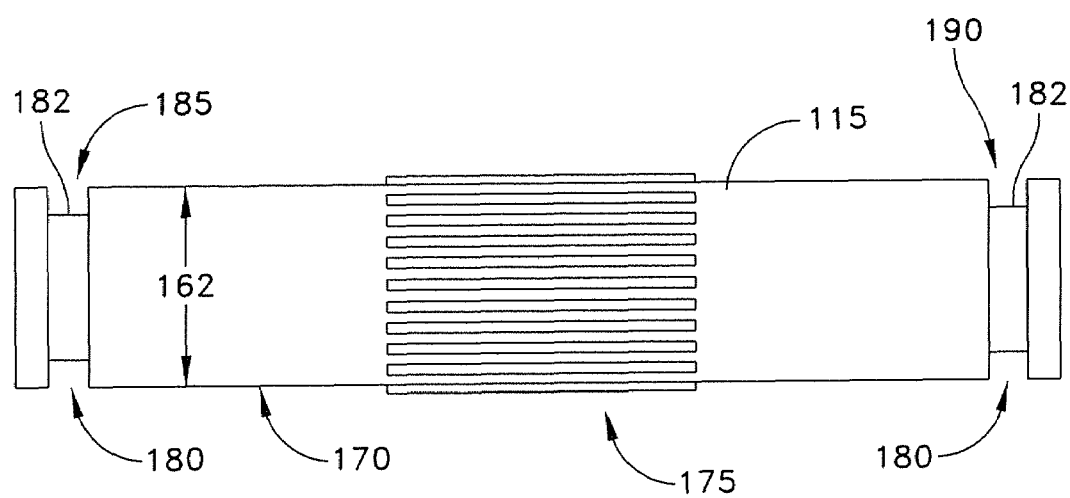
FIG. 4 is an illustration of a shaft with splines for selective attachment of the idler gear with the shaft, and a pair of radial recesses disposed at opposed end of the shaft for attachment of a retainer thereto.

Referring to FIG. 4, there is shown shaft 115 having an outer portion 170 forming an outer diameter 162 with a set of splines 175 thereon. In an embodiment, outer diameter 162 is sized for placement within inner diameter 152 of sleeve 110. The set of splines 175 of shaft 115 and the set of splines 160 of sleeve 110 may be sized for engagement with one another. In an embodiment, a pair of connectors 180 may be disposed at opposed ends 185, 190 of shaft 115.

Referring to FIGS. 1 and 7, there is shown bearing block 120 which is generally in attachment to the frame assembly of the shovel. A bore 195 extends through each of one of the at least one bearing block 120. In one embodiment, a counterbore is formed in bearing block 120.

Referring to FIGS. 1, and 8-10, there is shown one of the at least one bushing liner 125 for disposal within the at least one bearing block 120. Each bushing liner 125 has an inner surface 200 and an outer surface 205 in opposition to one another. Inner surface 200 of each one of the at least one bushing liner 125 forms an inner diameter 210 sized for placement of shaft 115 therein. Outer surface 205 of each of the at least one bushing liner 125 forms an outer diameter 215 sized for placement within bore 195 of each one of the pair of bearing blocks 120.

Figure 11:
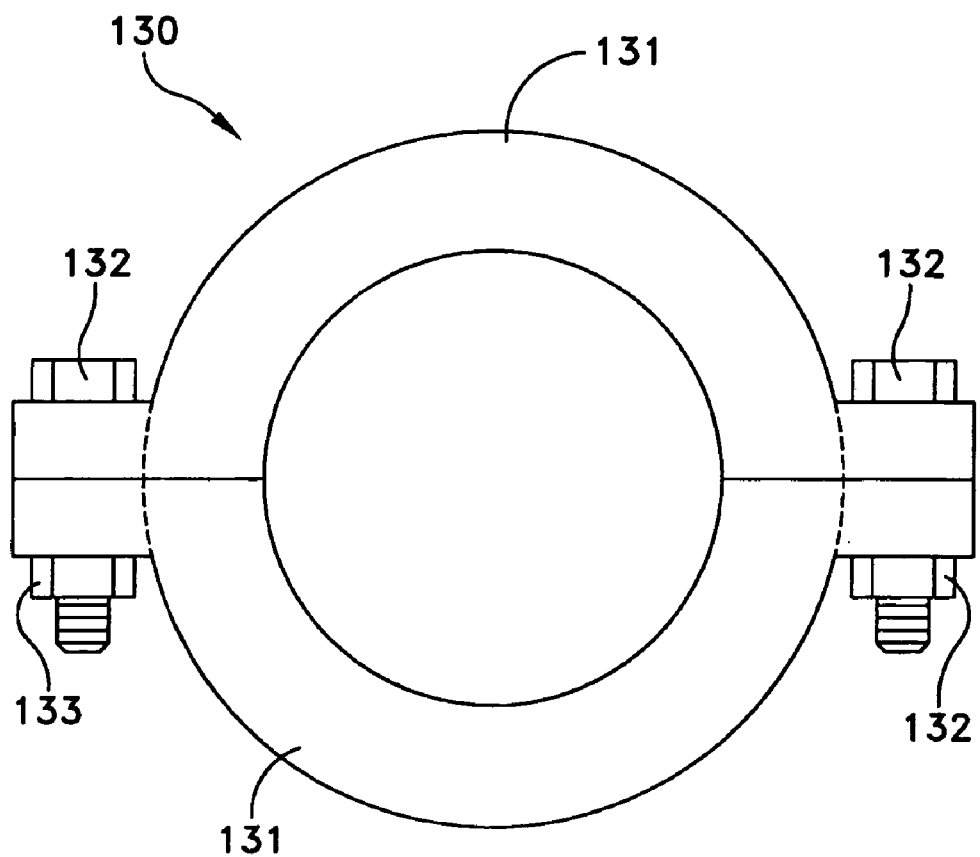
FIG. 11 is a diagrammatic illustration of a split collar retainer sized for attachment with the end of the idler shaft and to provide an axial thrust area to constrain axial movement of the shaft through each of the brass bushings.

Referring to FIGS. 1 and 11, there is shown the pair of retaining devices 130 for constraining shaft 115 from withdrawal from bore 195 of each one of bearing blocks 120. In an embodiment, the at least one retaining device 130 may be in removable attachment to connectors 180 disposed at opposed ends 185, 190 of idler shaft 115 respectively. Shaft 115 rotates within bearing block 120 as idler gear 105 rotates in response to movement of flexible track assembly. In an embodiment, the at least one retaining device 130 may rotate with shaft 115.

In an embodiment, grooves 182 (FIG. 4) may form the connectors 180 at opposed ends 185, 190 of shaft 115. In one embodiment, the at least one retaining device 130 may comprise at least two split collar retainers 131 (FIG. 11), which may include a pair of half-rings 131 attached by bolts 132 and nuts 133. In an embodiment, split collar retainers 130 rotate in attachment with shaft 115.

Figure 18:
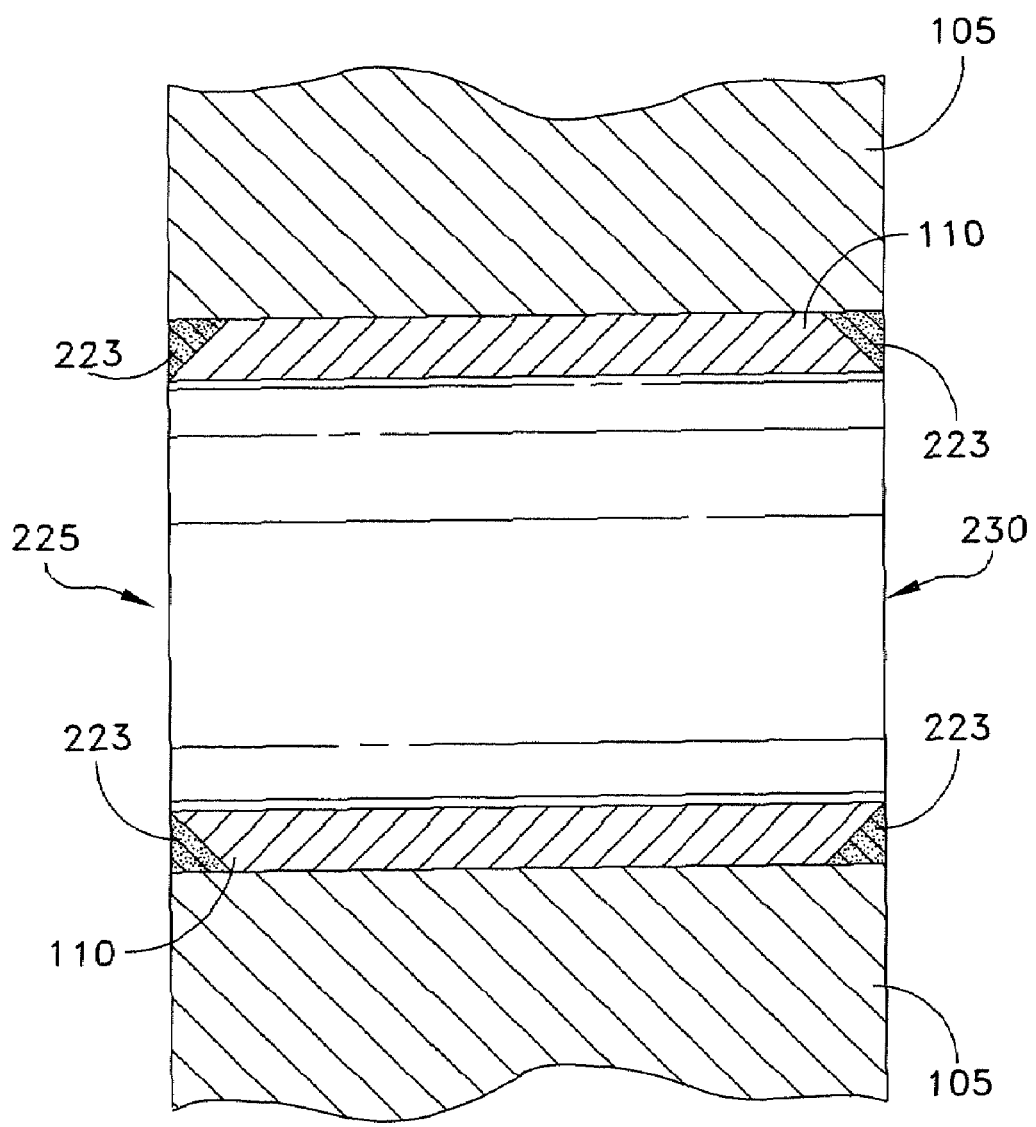
FIG. 18 is a partial cross-section of the gear and sleeve illustrated in FIGS. 1, 2 and 5.

Referring to FIG. 5, and in an embodiment, sleeve 110 may comprise a beveled edge 220 at opposed ends 225, 230. Referring to FIG. 18, beveled edge 220 may provide a recess between sleeve 110 and idler gear 105. For example, beveled edge 220 may extend at a 45 degree angle from inner surface 150. A weld 223 may be placed in the recess formed by beveled edge 220. This weld 223 may be formed, for example, by stainless wire or electrode, and may also be blended to finish the surface.

In an embodiment, the set of splines 160 may extend the full length of sleeve 110. In one embodiment, the set of splines 160 may cover a portion of sleeve 110 and be set back at each end. Optionally, ends of the set of splines 160 may be tapered inwardly for ease of assembly.

Figure 12:
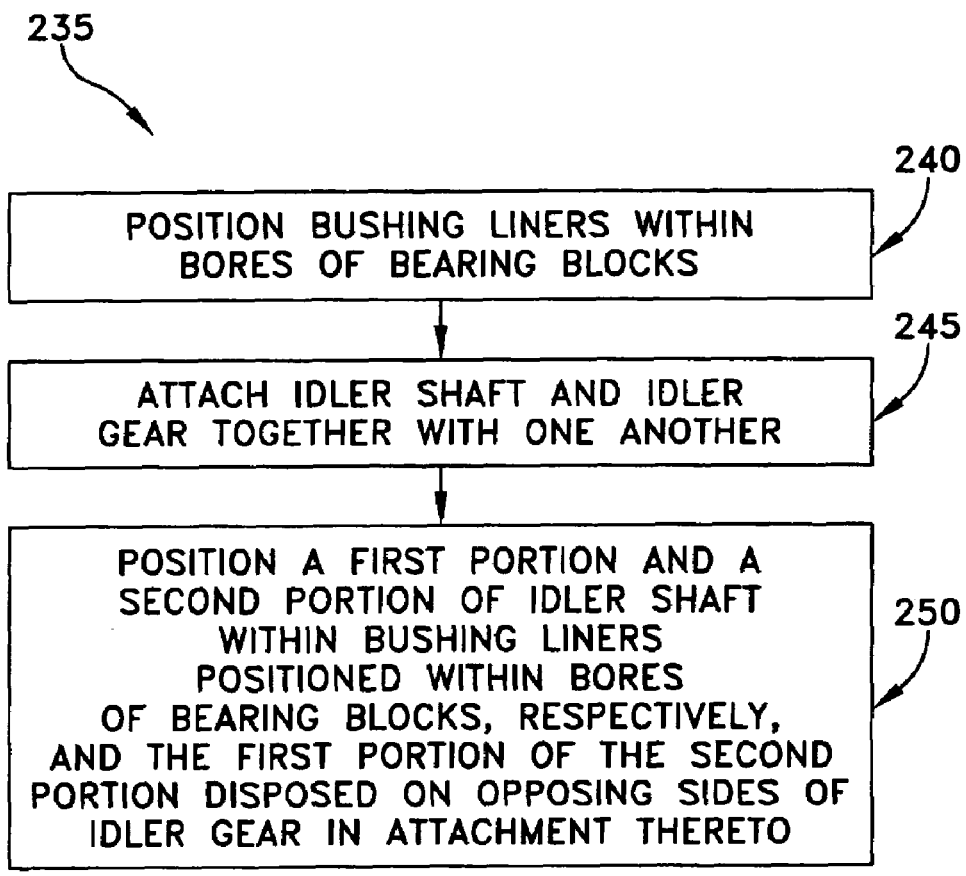
FIGS. 12-16 are flow chart diagrams illustrating methods for retrofitting a shovel with an improved idler assembly.

Looking at FIG. 12, and in an embodiment, there is provided a method 235 for retrofitting a shovel with a flexible track assembly from an existing idler assembly to an improved idler assembly 100. Method 235 generally comprises positioning 240 pair of bushing liners 125 within bores 195 of the pair of bearing blocks 120, respectively. Method 235 generally comprises attaching 245 idler shaft 115 and idler gear 105 together with one another, wherein shaft 115 rotates together with idler gear 105. Method 235 generally comprises positioning 250 a first portion and a second portion of idler shaft 115 within bushing liners 125 positioned within bores 195 of bearing blocks 120, respectively, and the first portion and the second portion disposed on opposing sides of idler gear 105 in attachment thereto.

Figure 13:
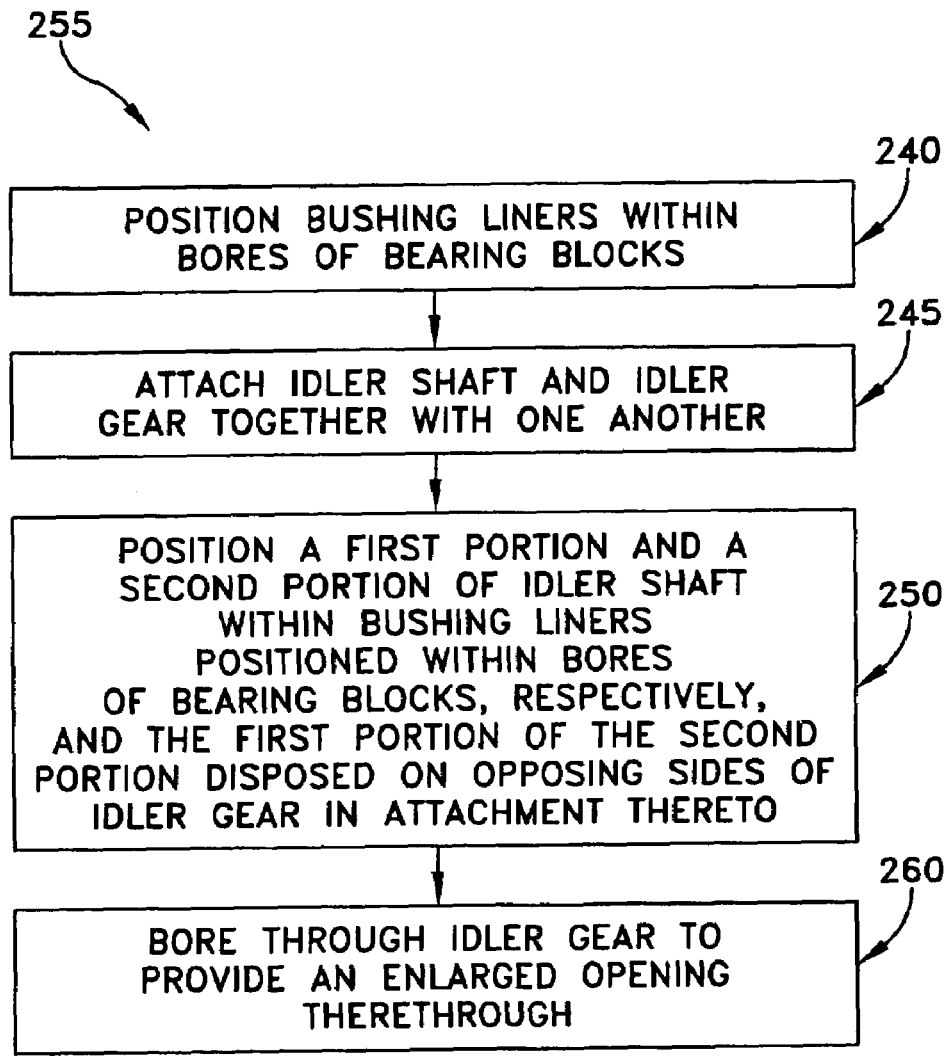

Referring to FIG. 13, and in an embodiment, there is provided a method 255 which includes method 235 and further comprises boring 260 through idler gear 105 to provide an enlarged opening 265 therethrough. Enlarged opening 265 may be sized for attachment of sleeve 110 therein.

Figure 14:
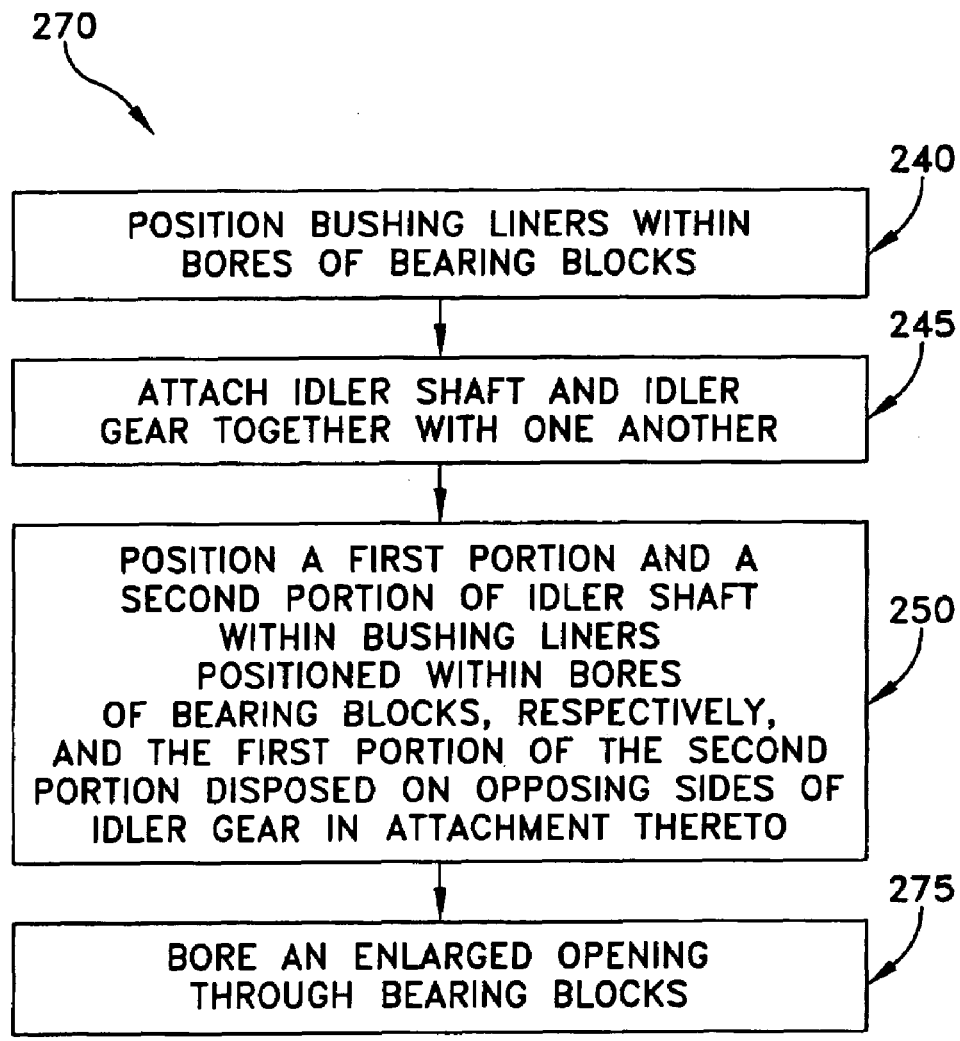

Referring to FIG. 14, and in an embodiment, there is provided a method 270 which includes method 235 and further comprises boring 275 an enlarged opening 280 through bearing blocks 120. Enlarged opening 280 may be sized for placement of bushing liners 125 therein.

Figure 15:
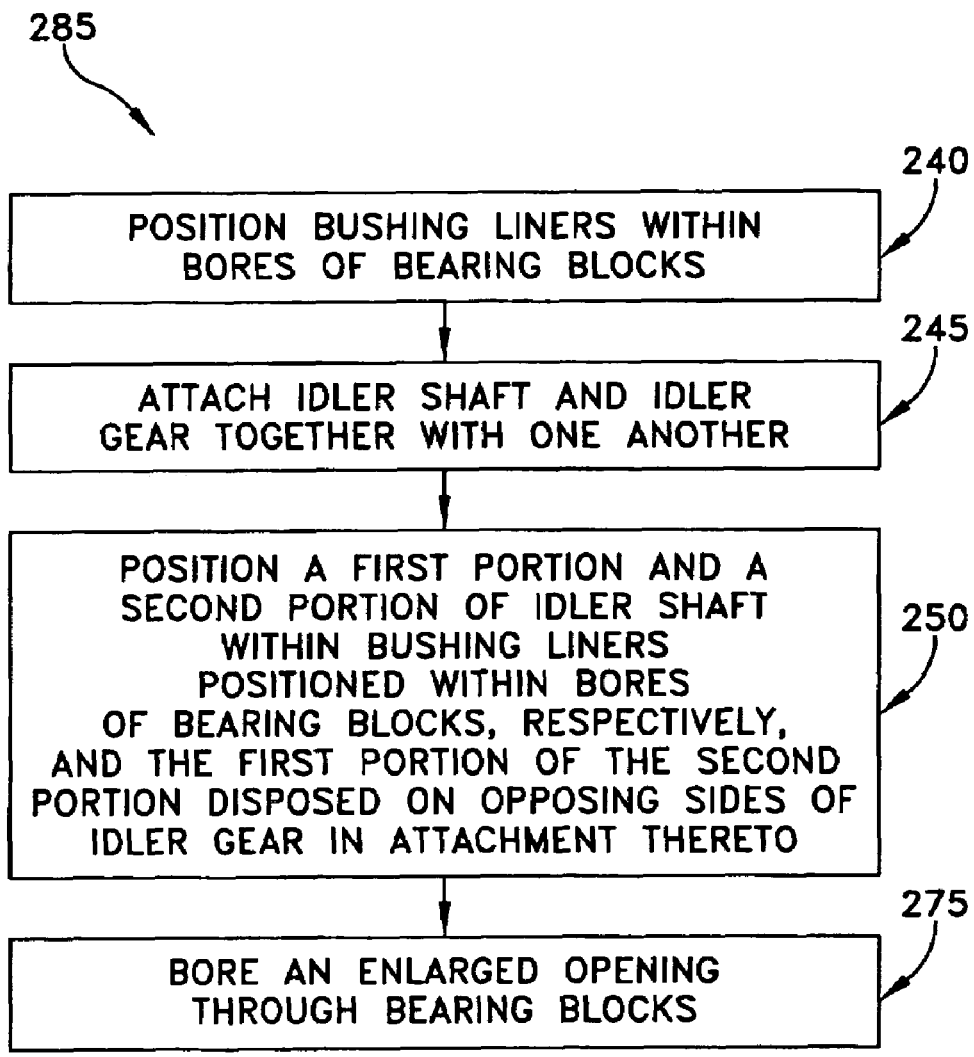

Referring to FIG. 15, and in an embodiment, there is provided a method 285 which includes method 270, bearing blocks 120 each have an inner portion 290 and an outer portion 295 in opposition to one another, and inner portion 290 is disposed toward idler gear 105. Method 285 further comprises boring 300 a countersink 305 at outer portion 295 of opening 280 of bearing blocks 120 prior to positioning pair of bushing liners 125 within bores 195 of pair of bearing blocks 120. In an embodiment, countersinks 305 provide an area for disposition of a thrust flange 310 extending from bushing liner 125.

Figure 16:
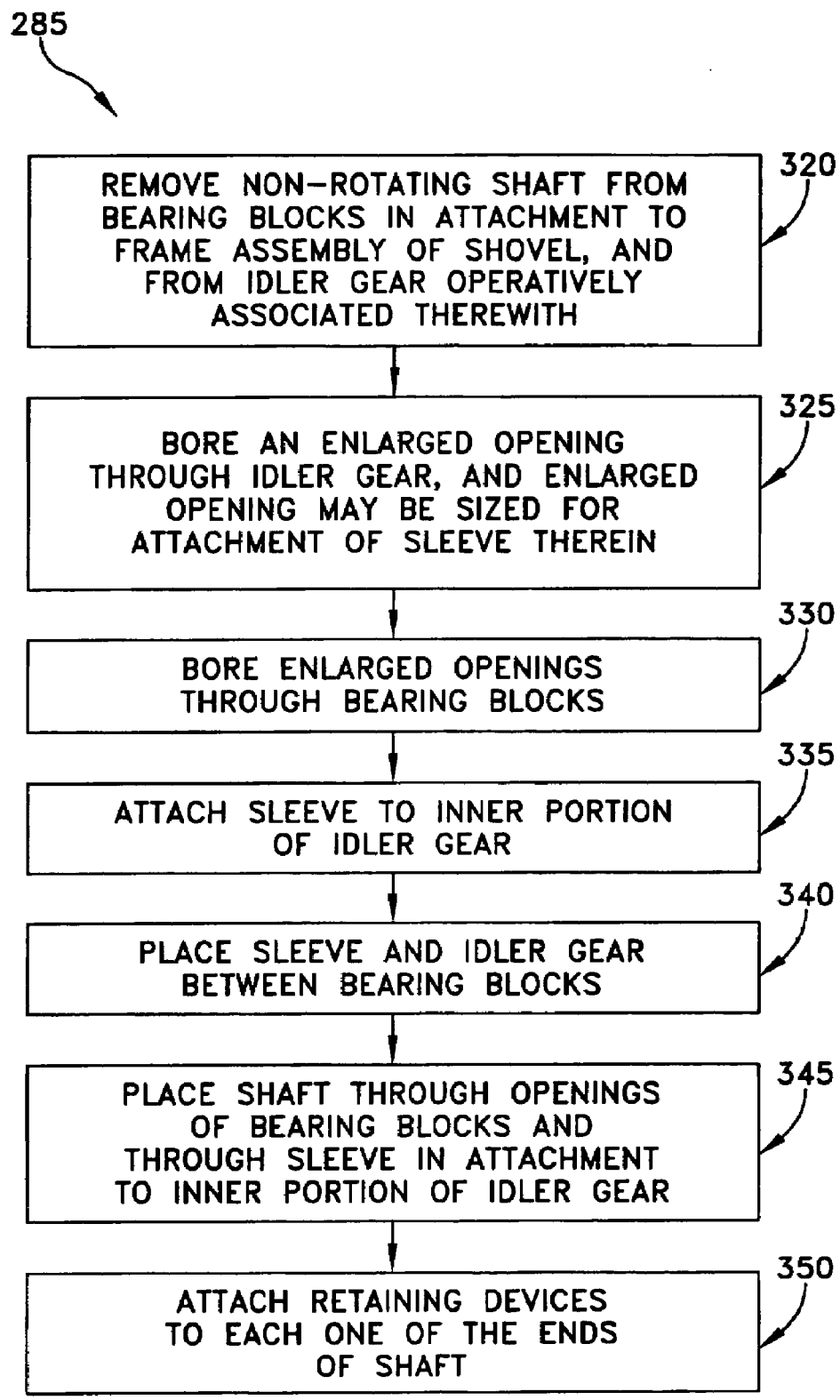

Looking at FIG. 16, and in one embodiment, there is provided a method 315 for retrofitting a shovel with flexible track assembly from an existing idler assembly to an improved idler assembly.

Method 315 generally comprises removing 320 a non-rotating shaft from the pair of bearing blocks 120 in attachment to the frame assembly of the shovel, and from the idler gear 105 operatively associated therewith. Method 315 generally comprises boring 325 an enlarged opening through the idler gear 105. Enlarged opening 265 265 may be sized for attachment of sleeve 110 therein.

Method 315 generally comprises boring 330 enlarged openings 280 through bearing blocks 120, respectively. Enlarged opening 280 may be sized for placement of bushing liners 125 in bearing blocks 120, respectively.

Method 315 generally comprises attaching 335 sleeve 110 to inner portion 135 of idler gear 105. Method 315 generally comprises placing 340 sleeve 110 and idler gear 105 between the pair of enlarged openings 280 of the pair of bearing blocks 120.

Method 315 generally comprises placing 345 shaft 115 through the pair of enlarged openings 280 of the pair of bearing blocks 120 and through sleeve 110 in attachment to inner portion 135 of idler gear 105. Sleeve 110 and shaft 115 may each comprise a set of splines 160, 175 that mate with one another, respectively.

Method 315 generally comprises attaching 350 retaining devices 130 to each one of the ends 185, 190 of shaft 115. Retaining devices 130 may constrain shaft 115 from withdrawal from bores 195 of each one of bearing blocks 120.

Figure 17:
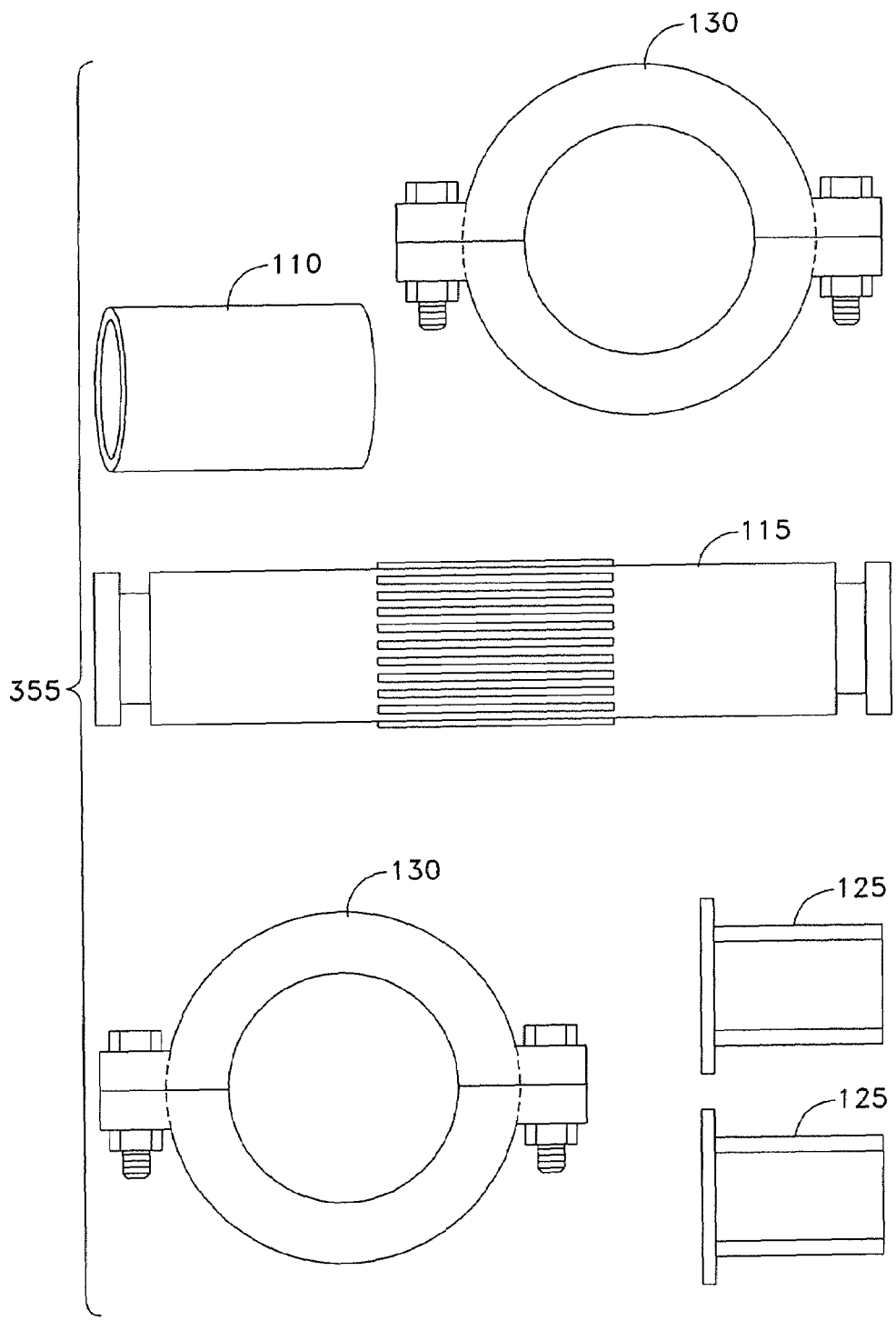
FIG. 17 is a kit for retrofitting a shovel with a flexible track assembly.

Looking at FIG. 17, and in one embodiment, there is provided a kit 355 for retrofitting a shovel with a flexible track assembly. Kit 355 may comprise sleeve 110, shaft 115, bushing liners 125, and retaining devices 130. In an embodiment, connectors 180 comprise grooves 182 formed in the opposed ends 185, 190 of shaft 115. In one embodiment, the pair of retaining devices 130 in kit 355 comprise the pair of split collar retainers 130. In an embodiment, the material hardness of bushing liners 125 is less than the material hardness of shaft 115. In one embodiment, the material hardness of bushing liners 125 is less than the material hardness of bearing blocks 120.

In an embodiment, there is provided an idler assembly for a shovel having flexible track assembly. Generally, the idler assembly may comprise idler gear 105, shaft 115, bearing blocks 120, bushing liners 125, and retaining devices 130.

Idler gear 105 may be operatively associated with flexible track assembly. Shaft 115 is fixedly connected to idler gear 105. Shaft 115 has a first portion and a second portion on opposed sides of the idler gear 105 such that the shaft 115 rotates together with idler gear 105.

Bearing blocks 120 may be in attachment to the frame assembly of the shovel. Each of bearing blocks 120 may form bore 195 therethrough. The first portion and the second portion of shaft 115 may each extend through one of bearing blocks 120, respectively.

Bushing liners 125 may be disposed within bores 195 of bearing blocks 120, respectively. Each of bushing liners 125 may have inner surface 200 and outer surface 205 in opposition to one another. Inner surface 200 of each of the bushing liners 125 may form inner diameter 210 sized for placement of shaft 115 therein. Outer surface 205 of each of bushing liners 125 may form outer diameter 215 sized for placement within bore 195 of each of the pair of bearing blocks 120.

Retaining devices 130 are provided for constraining shaft 115 from withdrawal from bore 195 of each one of the bearing blocks 120. Shaft 115 may rotate within the bearing blocks 120 as idler gear 105 rotates in response to movement of the flexible track assembly.

What is claimed is:

1. An idler assembly, comprising:
an idler gear having an opening formed therein;
an elongated tubular sleeve having a generally cylindrically shaped outer surface extending from one end to the other and an inner surface having a set of splines formed therein, said sleeve being received within the opening formed in said idler gear;
a shaft having first and second opposed ends and a set of splines formed thereon between the first and second opposed ends, said shaft being positioned within said sleeve so that the set of splines formed on said shaft engage the set of splines formed on the inner surface of said sleeve;
at least one bearing block having a bore formed therein, said bearing block positioned adjacent said idler gear; and
at least one bushing liner positioned within the bore formed in said bearing block, said bushing liner rotatably receiving the first opposed end of said shaft.

2. A kit for retrofitting a piece of equipment having a flexible track assembly, the kit comprising:
a cylindrical sleeve having an inner surface and an outer surface in opposition to one another, the inner surface of said cylindrical sleeve forming an inner diameter, a set of splines disposed on the inner surface, and the outer surface of cylindrical sleeve forming an outer diameter configured for attachment within an opening formed in an idler gear, said cylindrical sleeve having a length that is about equal a length of the opening formed in the idler gear, so that said sleeve will be substantially entirely contained within the opening formed in the idler gear when said sleeve is positioned within the opening;
a shaft having an outer portion with a set of splines thereon, the outer portion sized for placement within the inner diameter of the sleeve, the set of splines of the shaft and the set of splines of the sleeve sized for engagement with one another, and connectors disposed at opposed ends of the shaft, said shaft having a length that is greater than the length of said sleeve so that the opposed ends of said shaft extend beyond respective first and second sides of the idler gear when said shaft is positioned within said sleeve;

first and second bushing liners for disposal within bores formed within corresponding first and second bearing blocks on the piece of equipment, each of said first and second bushing liners having an inner surface and an outer surface in opposition to one another, the inner surface forming an inner diameter sized for placement of the shaft therein, and the outer surface forming an outer diameter sized for placement within the bore of the respective first and second bearing blocks; and first and second retaining devices for constraining the shaft from withdrawal from first and second bearing blocks on the piece of equipment, the first and second retaining devices being configured for removable attachment to the connectors disposed at opposed ends of said shaft wherein the shaft rotates within the at least one bearing block as the idler gear rotates.

3. The kit in accordance with claim 2, wherein the connectors comprise the opposed ends of the shaft having grooves formed therein.

4. The kit in accordance with claim 2, wherein each of said first and second retaining devices comprises a split collar retainer.

5. The kit in accordance with claim 2, wherein a material hardness of each of said first and second bushing liners is less than a material hardness of the shaft.

6. The kit in accordance with claim 5, wherein the material hardness of each of said first and second bushing liners is less than a material hardness of each of the first and second bearing blocks.

7. An idler assembly, comprising:

an idler gear having an opening formed therein;

a cylindrical sleeve having an inner surface having a set of splines formed therein, said cylindrical sleeve being received within the opening formed in said idler gear so that said cylindrical sleeve is substantially entirely contained within the opening formed in said idler gear;

a shaft having first and second opposed ends and a set of splines formed thereon between the first and second opposed ends, said shaft being positioned within said cylindrical sleeve so that the set of splines formed on said shaft engage the set of splines formed on the inner surface of said cylindrical sleeve and so that the first and second opposed ends of said shaft extend beyond respective first and second sides of said idler gear;

a first bearing block having a bore formed therein, said first bearing block positioned adjacent the first side of said idler gear;

a first bushing liner positioned within the bore formed in said first bearing block, said first bushing liner rotatably receiving the first opposed end of said shaft;

a second bearing block having a bore formed therein, said second bearing block positioned adjacent the second side of said idler gear;

a second bushing liner positioned within the bore formed in said second bearing block, said second bushing liner rotatably receiving the second opposed end of said shaft;

a first retaining device operatively engaged with the first opposed end of said shaft; and a second retaining device operatively engaged with the second opposed end of said shaft, said first and second retaining devices axially retaining said shaft within said first and second bearing blocks.

8. The idler assembly of claim 7, wherein the first and second opposed ends of said shaft have respective connectors disposed thereon and wherein said first and second retaining devices engage the connectors.

9. The idler assembly of claim 8, wherein the connectors comprise respective grooves formed in the first and second opposed ends of said shaft and wherein said first and second retaining devices comprise split collar retainers.

10. The idler assembly of claim 7, wherein said sleeve further defines a beveled edge on at least one of the opposed ends thereof, the beveled edge defining a recess between the sleeve and said idler gear.

11. The idler assembly of claim 10, further comprising a weld deposited within the recess between the beveled edge of said sleeve and said idler gear, said weld fixedly attaching said sleeve within the opening formed within said idler gear.

* * * * *